United States Patent [19]
Lee et al.

[11] Patent Number: 5,495,489
[45] Date of Patent: Feb. 27, 1996

[54] SECOND HARMONIC GENERATING METHOD AND APPARATUS

[75] Inventors: Jin-ho Lee; Young-mo Hwang, both of Seoul, Rep. of Korea

[73] Assignee: Samsung Electronics Co., Ltd., Kyungki, Rep. of Korea

[21] Appl. No.: 366,720

[22] Filed: Dec. 30, 1994

[30] Foreign Application Priority Data

May 7, 1994 [KR] Rep. of Korea ............... 94-9989
Dec. 12, 1994 [KR] Rep. of Korea ............... 94-33753

[51] Int. Cl.⁶ ..................................... H01S 3/04
[52] U.S. Cl. ............................... 372/34; 372/22
[58] Field of Search ......................... 372/22, 34, 36

[56] References Cited

U.S. PATENT DOCUMENTS 5,267,252 11/1993 Amano ............................. 372/34
5,287,367 2/1994 Yanagawa ........................ 372/34
5,329,539 7/1994 Pearson et al. ................... 372/36
5,399,858 3/1995 Kinoshita ......................... 372/36

*Primary Examiner*—Leon Scott, Jr.
*Attorney, Agent, or Firm*—Lowe, Price, LeBlanc & Becker

[57] ABSTRACT

A second harmonic generator for generating a stable harmonic includes an input mirror and an output mirror for providing a resonating section which is optically confined, second harmonic generation elements for generating a second harmonic using an externally applied pumping energy, and a casing for supporting the optical components. A temperature regulating device for mode selection is provided under the nonlinear birefringent crystalline device. A temperature correction device is provided in the peripheral surface of the casing for correcting the temperature of the casing. A controller senses the temperature of the casing and maintains the sensed temperature within a preset temperature range. Such a structure can generate a stable harmonic output even with large changes in ambient temperature. Particularly, the desired light output can be obtained within a short time.

5 Claims, 2 Drawing Sheets

SECOND HARMONIC GENERATING METHOD AND APPARATUS

BACKGROUND OF THE INVENTION

The present invention relates to a second harmonic generating method and apparatus, and more particularly, to a second harmonic generating method and apparatus capable of reducing a warm-up time and generating a stable second harmonic even with the variation of an ambient temperature environment.

A second harmonic generator, which adopts a frequency doubling principle within a resonator can be made compact and generate short wave visible light. Accordingly, the second harmonic generator is widely used as a light source for use in digital video recording/reproducing apparatuses, high resolution image processors, high speed data processors, etc.

Generally a second harmonic generator generates a blue-green laser. Such a second harmonic generator has a structure in which a gain medium such as Nd:YAG, a polarizer such as a Brewster plate and a non-linear birefringent device such as a KTP ($KTiOPO_4$) are provided on a single optical axis in an intracavity which is optically confined by two mirrors opposing each other.

The gain medium generates a fundamental wave using pumping laser which is applied thereto from an external source. Then, the non-linear birefringent crystalline device generates a second harmonic using the fundamental wave. Here, the polarizer allows specifically polarized light of the fundamental wave to pass therethrough and to be incident to the non-linear birefringent crystalline device.

A diode-laser-pumped intracavity second harmonic generator generates considerable heat during its operation. In particular, the second harmonic generation characteristic of the non-linear birefringent crystalline device is variable sensitively according to such heat variation.

There are two general methods for thermally stabilizing the second harmonic generator. One is an output compensation method and the other is a mode selection method.

First, in the compensation method, the variation of the second harmonic output is compensated to match a prescribed value by regulating an output of the laser diode when such an output is deviated from a reference value while monitoring the second harmonic output. A conventional second harmonic generator having such an output compensation mechanism has such a resonator as shown in FIG. 1.

Referring to FIG. 1, an input mirror 11 having a high transmittivity with respect to the pumping laser and a high reflectivity with respect to a fundamental wave and an output mirror 15 having a high transmittivity only with respect to the second harmonic are provided at both ends of a casing 10 having an intracavity, that is a resonant section, respectively. A gain medium 12 for generating a fundamental wave using the pumping laser, a polarizer 13 for passing specifically polarized light of the fundamental wave and a non-linear birefringent crystalline device 14 for generating a second harmonic using the incident fundamental wave are provided in the resonant section. A laser diode 21 for generating the pumping laser and a focus lens 22 for focusing the pumping laser into the intracavity are provided in front of a resonator, that is, before input mirror 11. On the other hand, a beam splitter 23 is provided at the back of the resonator, that is, after output mirror 15, to thereby separately reflecting part of the harmonic into a different path.

Also, a photo detector 24 for detecting the intensity of the input second harmonic is provided on the proceeding path of the second harmonic which is reflected from beam splitter 23. Photo detector 24 is electrically connected to a laser diode control circuit 20 for controlling the output of laser diode 21, and applies a monitor output of the second harmonic for controlling laser diode 21 as an electrical signal to laser diode control circuit 20. Control circuit 20 lowers the output of laser diode 21 when the second harmonic output exceeds a reference value, and increases the laser diode output when the second harmonic output is below the reference value.

As for the mode selection method, the output of the laser diode is held constant and the temperature of the non-linear birefringent crystalline device which is located in the intracavity is precisely regulated, to maintain a stable second harmonic output. A conventional second harmonic generator, having such a mode selection mechanism, is shown in FIG. 2.

Referring to FIG. 2, as described above, an input mirror 11a having a high transmittivity with respect to the pumping laser and a high reflectivity with respect to a fundamental wave and an output mirror 15a having a high transmittivity only with respect to the second harmonic are provided at both ends of a casing 10a maintaining the resonator structure, respectively. A gain medium 12a, a polarizer 13a and a non-linear birefringent crystalline device 14a are provided in a resonant section between input mirror 11a and output mirror 15a. A thermoelectric cooler 16a is provided in the lower portion of non-linear birefringent crystalline device 14a. As described above with respect to the aforementioned second harmonic generator, the intensity of the second harmonic is electrically converted and fed back to a control circuit (not shown), to regulate the temperature of non-linear birefringent crystalline device 14a.

The above actual structure is specifically disclosed in U.S. Pat. No. 3,858,056, in which part of the output light is reflected via a beam splitter and the reflected light is fed back as an electrical signal. Here, temperature of a nonlinear birefringent crystalline device is regulated by a stepping motor and a potentiometer operated by the stepping motor. However, such a structure requires a long warm-up time (more than five minutes) for preparing the second harmonic generation, and has another drawback in that precise temperature control of the nonlinear birefringent crystalline device is difficult.

Generally, to stabilize the second harmonic output to within ±3% of a prescribed value in the above-described mode selection method, the temperature deviation of the non-linear birefringent crystalline device should be limited to within about ±0.01° C.

In the diode-laser-pumped intracavity second harmonic generator, a thermal stability of the material of the metal support member which maintains the resonator is a very important factor in output stability. Generally, when the thermal stability of the metal support member is lowered, the axial mode of the laser output becomes erratic, to thereby make the laser output unstable, which is called "hopping."

Therefore, it is desirable that a material having a low coefficient of linear expansion is used as that of the resonator support member. A metallic material such as aluminum whose coefficient of linear expansion is $24 \times 10^{-6}$/°C. or brass whose coefficient of linear expansion is $19 \times 10^{-6}$/°C. is often used as the resonator support member. Also, a glass material may be used as the resonator support member considering the cost of the material (see U.S. Pat. No. 5,170,409).

However, since resonator is at most tens of millimeters in length, even though the temperature deviation is less than 1°–2° C. in the case of limited compactness, the output hopping phenomenon still occurs.

Thus, when the length of the resonator is extremely short, a material for a support member having an extremely low coefficient of linear expansion (below an order of $10^{-7}$°C.) should be used for preventing such a mode hopping phenomenon. Otherwise, a structure for generating an extremely small linear expansion should be provided. However, there are few materials having such a coefficient of linear expansion among those currently available materials, which is disadvantageous in view of costs.

SUMMARY OF THE INVENTION

To solve the above problems, it is an object of the present invention to provide an improved second harmonic generating method and apparatus capable of generating a stable second harmonic in which thermal stability is maintained even with changes in the ambient temperature environment.

Also, another object of the present invention is to provide a second harmonic generating method and apparatus capable of enabling fast mode selection and outputting a stable second harmonic within a short time.

To accomplish the above object, there is provided a second harmonic generating method according to the present invention comprising the steps of: obtaining a fundamental wave from a gain medium by irradiating a pumping laser in a resonator which is optically confined; generating a second harmonic by irradiating specific polarized light of the fundamental wave to a nonlinear birefringent crystalline device; thermally stabilizing the resonator by regulating the ambient temperature of the resonator into an appropriate temperature; warming up the birefringent crystalline device by regulating the temperature of the nonlinear birefringent crystalline device; and obtaining a target output by regulating the temperature of the nonlinear birefringent crystalline device into a temperature of the target output.

In the above method, the temperature adjusted through the warming-up step can be lower than the temperature corresponding to the target output, and vice versa. However, it is preferable to determine the warming-up temperature to be lower than the target temperature. It is also desirable that the temperature of the nonlinear birefringent crystalline device is continuously increased or decreased to thereby regulate the temperature of the nonlinear birefringent crystalline device into a target temperature when selecting the desired output. It is necessary for the output value corresponding to the temperature range from the warming-up temperature to the target temperature less than or equal to the target output.

Also, there is provided a second harmonic generating apparatus according to the present invention comprising: an input mirror and an output mirror for providing a resonating section of a predetermined length which is optically confined; second harmonic generation means provided in the resonating section for generating a second harmonic using an pumping energy applied from an external source; a temperature regulation device for regulating the temperature of the nonlinear birefringent crystalline device; a casing which encloses the resonating section for supporting the input and output mirrors and the second harmonic generation means; a temperature correction device provided in the outer surface of the casing for correcting the temperature of the casing; and a controller for controlling the temperature correction device so as to sense the temperature of the casing and maintain the temperature of the casing within a preset temperature range.

In the above apparatus, it is desirable that the temperature correction apparatus is installed to cover a longitudinal direction of the circumferential surface of the casing, for preventing the distance between the input mirror and the output mirror in the casing from being varied.

BRIEF DESCRIPTION OF THE DRAWINGS

Further features and advantages of the present invention will become more apparent from the following description, reference being made to accompanying drawings wherein a preferred embodiment of present invention is clearly shown.

In the drawings.

DETAILED DESCRIPTION OF THE INVENTION

Figure 1:
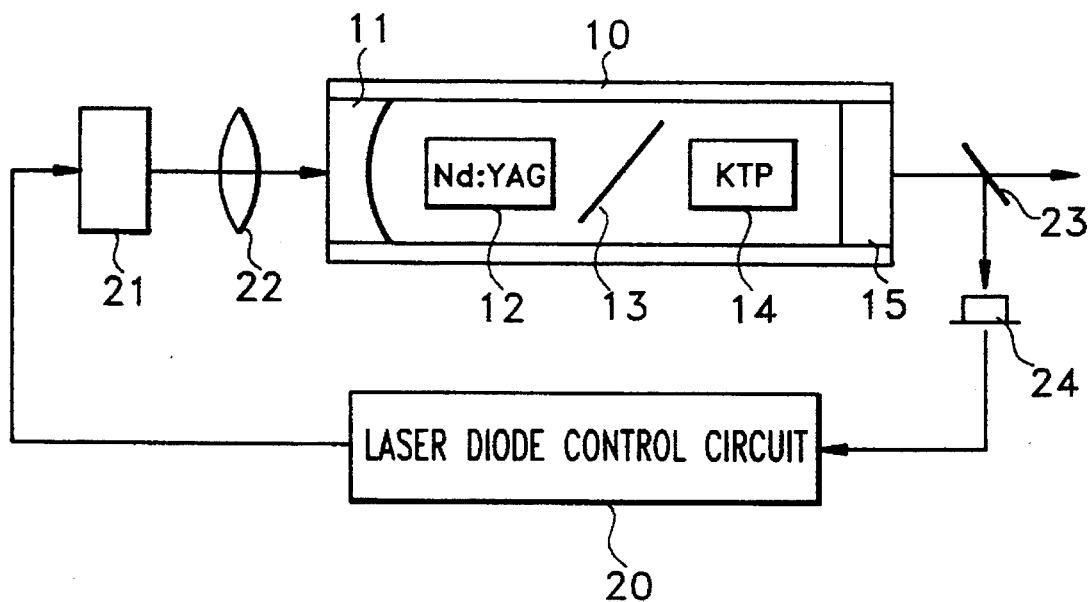
FIG. 1 shows a schematic structure of a conventional second harmonic generator.
Figure 2:
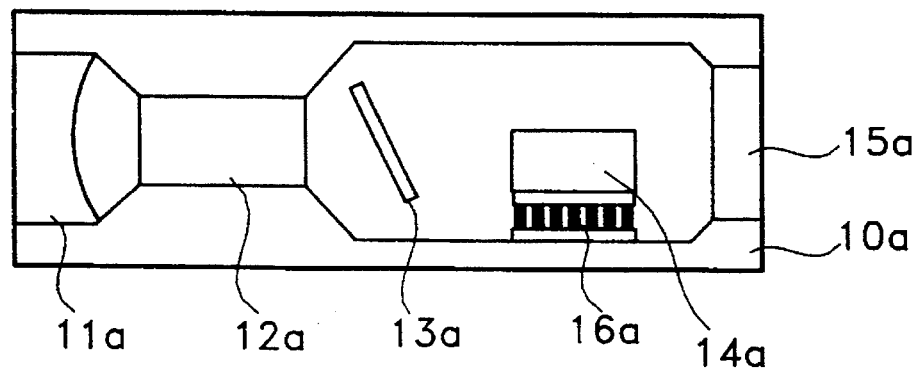
FIG. 2 shows a schematic structure of another conventional second harmonic generator.
Figure 3:
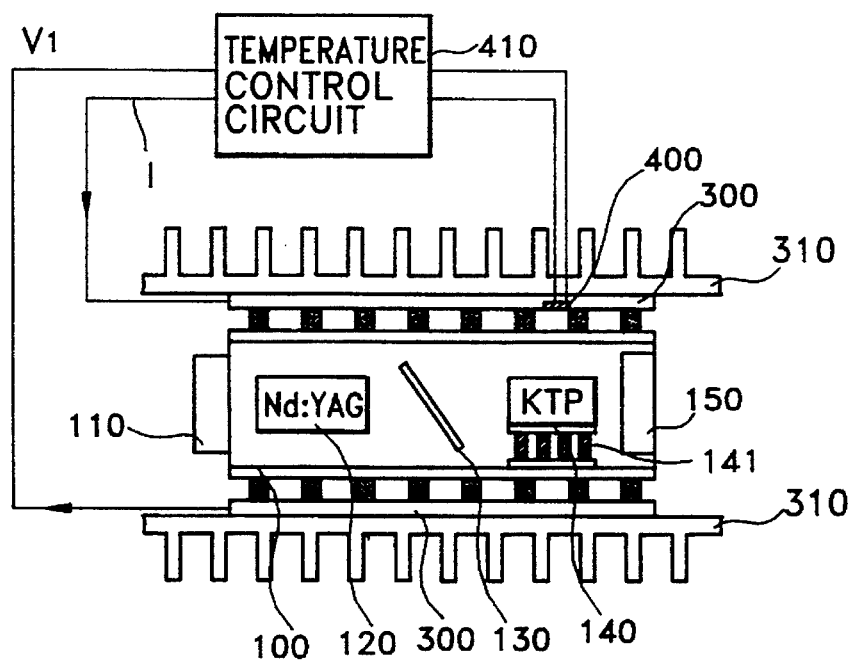
FIG. 3 shows a schematic cross-sectional structure of a second harmonic generator according to the present invention.

A preferred embodiment of a second harmonic generator according to the present invention will be described below with reference to FIG. 3 showing a schematic cross-sectional structure of a second harmonic generator.

The second harmonic generating apparatus according to the present invention includes a second harmonic generating portion for generating a second harmonic using an externally applied pumping energy located between an input mirror and an output mirror which oppose each other to provide a resonating section of a predetermined length which is optically confined, and a casing for protectively supporting the above components. In addition, the second harmonic generating apparatus includes a temperature correction device provided in the circumferential surface of the casing for correcting the temperature of the casing and a controller for sensing the temperature of the casing and controlling the temperature correction device to maintain the temperature of the casing to be within a preset temperature range.

Figure 4:
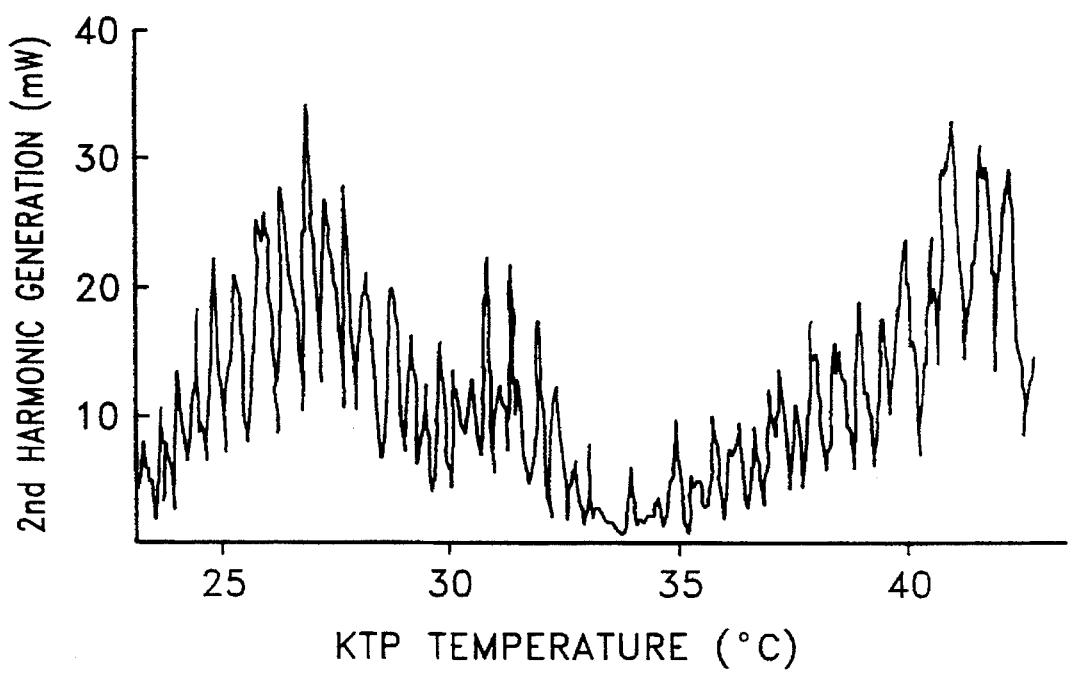
FIG. 4 is a mode characteristic graph of the nonlinear birefringent crystalline device of FIG. 3.

To be more specific, an input mirror 110 having a high transmittivity with respect to the pumping laser and a high reflectivity with respect to a fundamental wave and an output mirror 150 having a high transmittivity only with respect to the second harmonic are provided at both ends of a casing 100 having an internal intracavity which provide a laser beam oscillating space, respectively. To constitute the second harmonic generating portion, a gain medium 120 for generating a fundamental wave using the pumping laser, a polarizer 130 for passing specifically polarized light of the fundamental wave, and a non-linear birefringent crystalline device 140 for generating a second harmonic using the incident fundamental wave are provided in casing 100. A temperature regulating device 141 made of a thermoelectric device such as a Peltier device is located under nonlinear birefringent crystalline device 140. The temperature regulating device 141 selects one among various modes having different values as shown in FIG.4 and obtains a desired output.

In such a structure, casing 100 serves as a support member for supporting the above optical components. One or more thermoelectric temperature correction devices 300 (two in FIG. 3) are attached to the external surface of casing 100. Also, each temperature correction device 300 is provided with a heat sink 310 used for heat emission or heat absorption. Temperature correction device 300 and heat sink 310 are both of a size capable of entirely enclosing casing 100. A change of the resonance distance, that is, the distance between input mirror 110 and output mirror 150, due to an expansion or contraction of the casing supports the resonator, should be reduced. Thus, it is necessary to install the temperature correction device so as to cover the casing along its circumferential direction, thereby preventing the distance between the input mirror and the output mirror in the casing from changing due to a variation in the temperature of the casing.

Also, a thermistor 400 for temperature detection is provided in heat sink 310. Thermistor 400 is electrically connected to temperature control circuit 410 for controlling temperature correction device 300. Temperature control circuit 410 controls the direction and amount of current with respect to temperature correction device 300, and makes temperature correction device 300 cool or heat the casing 100. Temperature correction devices 300 can be connected in parallel or connected in series as in the present embodiment. Temperature correction device 300 adopts a device using a general Peltier effect, that is, a thermoelectric heater/cooler. Since casing 100 should be cooled in a normal environment, temperature correction device 300 can correct the temperature of casing 100 only by a cooling function. However, in severe situations such an atmosphere of an extremely low temperature, the temperature of casing 100 can be maintained by heating the casing up to a proper temperature to stably generate the lased light. Thus, the temperature correction device may have a cooling function or heating function only, or may have both the cooling function and the heating function, which is user selected. Also, the temperature control circuit has a general composition which includes a converter for converting a change of resistance of the thermistor into an electrical change, a differential amplifier for comparing the obtained electrical signal with a reference signal and amplifying difference between the electrical signal and the reference signal, and a power amplifier for power amplifying the output from the differential amplifier. Here, since the direction of the current output determines a function of the temperature correction device, that is, the cooling and/or heating function, a function capable of changing direction of the current by a selective specification is internally assigned as described above. Such a temperature correction device detects only the temperature of the casing, compares the detected value with the reference value, and reflects the compared result on a temperature controlling action, to thereby maintain the casing temperature in a predetermined range. Thus, various modifications based on a conventional technology are possible within the scope of the present invention.

Hereinafter, an operation of the second harmonic generating apparatus according to the present invention having such a structure as described above will be described.

If a laser diode (not shown) having an output of 500 mW generates a red laser beam of a wavelength of approximate 809 nm and the generated red laser beam is incident in the resonator via input mirror 110, gain medium 120 emits a fundamental wave, polarizer 130 filters specific polarization light and non-linear birefringent crystalline device 140 generates a second harmonic. At this time, casing 100 is heated up to temperature of approximately 30° C. However, casing 100 is also influenced by the ambient temperature, such that the temperature of casing 100 may be lower or higher than a prescribed temperature. The temperature change of casing 100 due to ambient temperature fluctuations raises a considerable problem if such fluctuations are severe. Thus, casing 100 may contract or expand accordingly, thereby causing the distance between the optical components, particularly the distance between input mirror 110 and output mirror 150, to alter. However, to obviate such a phenomenon in the present invention, thermoelectric control device 300 which is provided on a circumferential surface of casing 100 controls the temperature of casing 100 to be maintained in a predetermined range. Thus, the abnormal expansion or contraction of casing 100 appears in an extremely small state which does not influence the change of the mode.

In addition to the temperature correction, the current should flow immediately in temperature regulating device 141 such that the output is maintained below the target output, so as to temporarily locate the crystalline device in the warmed state. In this state, it is important that the peak value of the output corresponding to the temperature between the warm-up temperature and the target temperature should be lower than the target output. Here, the temperature correction of the casing can be accomplished in two ways. One is a continuous cooling process in which a reference temperature is set lower than the ambient temperature, to thereby maintain the temperature of the casing to be within a predetermined range by properly cooling the casing when its temperature increases due to a rise in ambient temperature. The other is a continuous heating process in which the reference temperature is set higher than the ambient temperature, to thereby maintain the temperature of the casing to be within a predetermined range by properly heating the casing when the casing temperature decreases due to a lowering of the ambient temperature.

Among the above two kinds of the temperature correction, maintaining the temperature of the casing by cooling is generally adapted. However, under the special circumstances described above, maintaining the temperature of the casing by heating can be adopted. Such a dual temperature correction method minimizes the variation in resonating distance by constantly maintaining the temperature of the casing over changing ambient temperatures and regardless of internally generated heat.

It is desirable that the temperature control of the casing is maintained within a range of ±0.2° C. According to such a casing temperature maintaining function, even if the ambient temperature fluctuates as much as ±25° C., the temperature of the casing can be maintained within a range of ±0.2° C. with respect to a prescribed temperature.

Once the temperature correction of casing 100 is completed through the above processes, a harmonic output becomes stabilized. When the mode becomes stabilized as described above, the amount of current flowing through temperature regulating device 141 is increased or decreased to shift the temperature to the target temperature corresponding to the target output, to thereby determine a harmonic output. As described above, according to a series of processes including a mode selection through the temperature stabilization of the casing and the temperature regulation of the nonlinear birefringent crystalline device, a desired harmonic output can be obtained within only one minute.

In the conventional resonator, to limit the output variation of the second harmonic having a wavelength of 30 nm to within ±3%, ambient temperature should stay within ±1° C.

On the other hand, when the temperature of the resonator using the present invention is controlled, the permissible range of ambient temperature change can be expanded up to 0°–50° C. Thus, it can be seen that the second harmonic generator of the present invention exhibits excellent reliability.

As described above, the present invention can generate a very stable harmonic even over large changes in the ambient temperature. Particularly, a stable light output can be obtained, within a very short time (approximately one minute) after the mode selection. Also, a commercially available material such as aluminum, stainless steel, etc., can be used for the casing, which provides a great cost advantage.

What is claimed is:

1. A second harmonic generating method according to the present invention comprising the steps of:

obtaining a fundamental wave from a gain medium by irradiating a pumping laser in a resonator which is optically confined;

generating a second harmonic by irradiating specific polarized light of the fundamental wave to a nonlinear birefringent crystalline device;

thermally stabilizing the resonator by regulating the ambient temperature of the resonator into an appropriate temperature;

warming up the birefringent crystalline device by regulating the temperature of the nonlinear birefringent crystalline device; and obtaining a target output by regulating the temperature of the nonlinear birefringent crystalline device into a temperature of the target output.

2. A second harmonic generating method according to claim 1, wherein said temperature of the nonlinear birefringent crystalline device is continuously varied to thereby regulate the temperature of the nonlinear birefringent crystalline device into a target temperature when selecting the target output.

3. A second harmonic generating apparatus comprising:

an input mirror and an output mirror for providing a resonating section of a predetermined length which is optically confined;

second harmonic generation means provided in the resonating section for generating a second harmonic using an pumping energy applied from an external source;

a temperature regulation device for regulating the temperature of the nonlinear birefringent crystalline device;

a casing which encloses the resonating section for supporting the input and output mirrors and the second harmonic generation means;

a temperature correction device provided in the circumferential surface of the casing for correcting the temperature of the casing; and a controller for controlling the temperature correction device so as to sense the temperature of the casing and maintain the temperature of the casing within a preset temperature range.

4. A second harmonic generating apparatus according to claim 3, wherein said temperature correction apparatus is installed to cover a longitudinal direction of the circumferential surface of the casing, for preventing the distance between the input mirror and the output mirror in the casing from being varied.

5. A second harmonic generating apparatus according to claim 3, wherein said controller controls said temperature correction device so as to heat or cool said casing.

* * * * *